United States Patent
Hasegawa et al.

(10) Patent No.: US 9,502,935 B2
(45) Date of Patent: Nov. 22, 2016

(54) HUB SHELL FOR BICYCLE GENERATOR HUB

(75) Inventors: Hiroshi Hasegawa, Osaka (JP); Akira Nakabayashi, Osaka (JP)

(73) Assignee: Shimano Inc., Osaka (JP)

( * ) Notice: Subject to any disclaimer, the term of this patent is extended or adjusted under 35 U.S.C. 154(b) by 1098 days.

(21) Appl. No.: 13/595,767

(22) Filed: Aug. 27, 2012

(65) Prior Publication Data

US 2013/0154446 A1 Jun. 20, 2013

(30) Foreign Application Priority Data

Dec. 20, 2011 (JP) ................................ 2011-278030

(51) Int. Cl.
| | |
|---|---|
| B62J 6/12 | (2006.01) |
| B62J 6/08 | (2006.01) |
| H02K 1/18 | (2006.01) |
| B60B 27/04 | (2006.01) |
| H02K 1/27 | (2006.01) |
| B60B 27/02 | (2006.01) |
| H02K 15/12 | (2006.01) |

(52) U.S. Cl.
CPC ............. *H02K 1/2786* (2013.01); *B62J 6/12* (2013.01); *B60B 27/026* (2013.01); *H02K 15/12* (2013.01)

(58) Field of Classification Search
CPC ...................................................... H02K 1/27
USPC ........... 310/67 A, 74, 75 C, 89, 154.01, 402; 301/110.5; 362/475
See application file for complete search history.

(56) References Cited

U.S. PATENT DOCUMENTS

| | | | | |
|---|---|---|---|---|
| 4,559,462 A | * | 12/1985 | Hernandez-Badillo | H02K 5/1737 301/110.5 |
| 5,079,461 A | * | 1/1992 | Schluter et al. | 310/67 A |
| 7,898,136 B2 | * | 3/2011 | Poulin et al. | 310/156.26 |
| 2010/0316248 A1 | * | 12/2010 | Martinez-Iranzo | 381/397 |
| 2011/0156543 A1 | * | 6/2011 | Nakano | 310/67 A |

FOREIGN PATENT DOCUMENTS

| | | | |
|---|---|---|---|
| CN | 102107701 A | | 6/2011 |
| DE | 4232182 A1 | | 3/1994 |
| DE | 19714780 A1 | | 10/1998 |
| JP | 57059460 A | * | 4/1982 |
| JP | 06193583 A | * | 7/1994 |
| JP | 11-69735 A | | 3/1999 |
| JP | 2004-242374 A1 | | 8/2004 |
| JP | 2006180576 A | * | 7/2006 |

* cited by examiner

*Primary Examiner* — Jose Gonzalez Quinones
(74) *Attorney, Agent, or Firm* — Global IP Counselors

(57) ABSTRACT

A hub shell is used as a part of a bicycle generator hub. The hub shell comprises a main body and a magnet arrangement section. The main body has a tubular shape with an internal circumferential surface. The magnet arrangement section is provided on the internal circumferential surface of the main body to arrange a magnet formed therein by injection molding. The magnet arrangement section includes an even section and a non-even section, the non-even section being configured as one of a recess and a protrusion with respect to the even section.

16 Claims, 7 Drawing Sheets

HUB SHELL FOR BICYCLE GENERATOR HUB

CROSS-REFERENCE TO RELATED APPLICATIONS

This application claims priority under 35 U.S.C. §119 to Japanese Patent Application No. 2011-278030, filed Dec. 20, 2011. The entire disclosure of Japanese Patent Application No. 2011.-278030 is hereby incorporated herein by reference.

BACKGROUND

Field of the Invention

This invention generally relates to a hub shell for a bicycle generator hub and a generator hub equipped with the hub shell.

Background Information

A bicycle generator hub having a magnets arranged on an internal circumferential surface of a bicycle hub shell is known (e.g., Japanese Laid-Open Patent Publication No. 2004-242374). Typically the magnet is fixed to the internal circumferential surface of the hub shell with an adhesive.

SUMMARY

Generally, the present disclosure is directed to various features of a hub shell for a bicycle generator hub.

When the magnet is fixed with an adhesive in the conventional manner, a step for applying the adhesive and a step for attaching the magnet are require and the process of fixing the magnet to the hub shell becomes complex. In order to simplify the magnet fixing process, it is feasible to form the magnet on the internal circumferential surface of the hub shell by injection molding using an insert molding method or other molding method. However, positioning the magnet has been difficult when using injection molding to form the magnet on the internal circumferential surface of the hub shell.

An object of the present invention is to enable a magnet that is injection molded in a hub shell for a generator hub to be formed more simply and positioned more reliably.

In accordance with a first aspect, a hub shell is provided that is used as a part of a bicycle generator hub. The hub shell basically comprises a main body and a magnet arrangement section. The main body has a tabular shape with an internal circumferential surface. The magnet arrangement section is provided on the internal circumferential surface of the main body to arrange a magnet formed therein by injection molding. The magnet arrangement section includes an even section and a non-even section, the non-even section being configured as one of a recess and a protrusion with respect to the even section.

With this hub shell, the magnet arrangement section in which the magnet is injection molded includes an even section and a non-even section. If the non-even section is a recess, then the magnet can be simply and reliably positioned by injection molding the magnet such that a portion of the magnet enters into the non-even section. If the non-even section is a protrusion, then the magnet can be simply and reliably positioned by injection molding the magnet such that a portion of the magnet enters around the non-even section.

In accordance with a second aspect, the hub shell according to the first aspect is provided such that the non-even section is configured to a linear shape and to extend non-parallel with respect to each of an axial direction and a circumferential direction of the main body. With this aspect, since the linearly shaped non-even section extends non-parallel with respect to each of the axial and the circumferential direction, movement of the magnet can be restricted in both the axial direction and the circumferential direction and the magnet can be positioned simply and reliably.

In accordance with a third aspect, the hub shell according to the second aspect is provided such that the non-even section has a helical shape. With this aspect, since the non-even section has a continuous helical shape, the non-even section can be obtained easily.

In accordance with a fourth aspect, the hub shell according to the second aspect is provided such that the non-even section has an endless shape. With this aspect, since the non-even section has an endless shape and can be formed with a single process, the non-even section can be obtained easily.

In accordance with a fifth aspect, the hub shell according to the fourth aspect is provided such that the non-even section includes a plurality of separate non-even section. Since non-even sections have endless shapes, the magnet can be positioned even more reliably.

In accordance with a sixth aspect, the hub shell according to the first aspect is provided such that the non-even section includes a first non-even section that has a linear shape and extends in an axial direction of the main body, and a second non-even section that has a linear shape and extends in a circumferential direction of the main body. With this aspect, since the shape of the non-even section is simple, the non-even section can be formed simply.

In accordance with a seventh aspect, the hub shell according to any one of the first to sixth aspects is provided such that the non-even section is configured as a recess. With this aspect, the recessed non-even section can be formed with a simple machining process (cutting process).

In accordance with an eighth aspect, the hub shell according to any one of the first to sixth aspects is provided such that the non-even section is configured as a protrusion. With this aspect, the protruded non-even section can be formed easily as a separate member from the hub shell. Thus, the non-even section can be formed simply using a molding process.

In accordance with a ninth aspect, the hub shell according to any one of the first to eighth aspects is provided with a magnet injection molded on the magnet arrangement section of the main body. With this aspect, a rotor can be obtained which exhibits the operational effects of the first to eight aspects.

In accordance with a tenth aspect, a bicycle generator hub is provided that includes the hub shell according to the ninth aspect and further comprises a hub axle rotatably disposed in the main body of the hub shell, and a stator fixed to the hub axle. With this aspect, a bicycle generator hub can be obtained which exhibits the operational effects of the first to sixth aspects.

With the present invention, the magnet arrangement section of the hub shell includes an even section and a non-even section. As a result, a magnet can be simply and reliably positioned with the non-even section.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
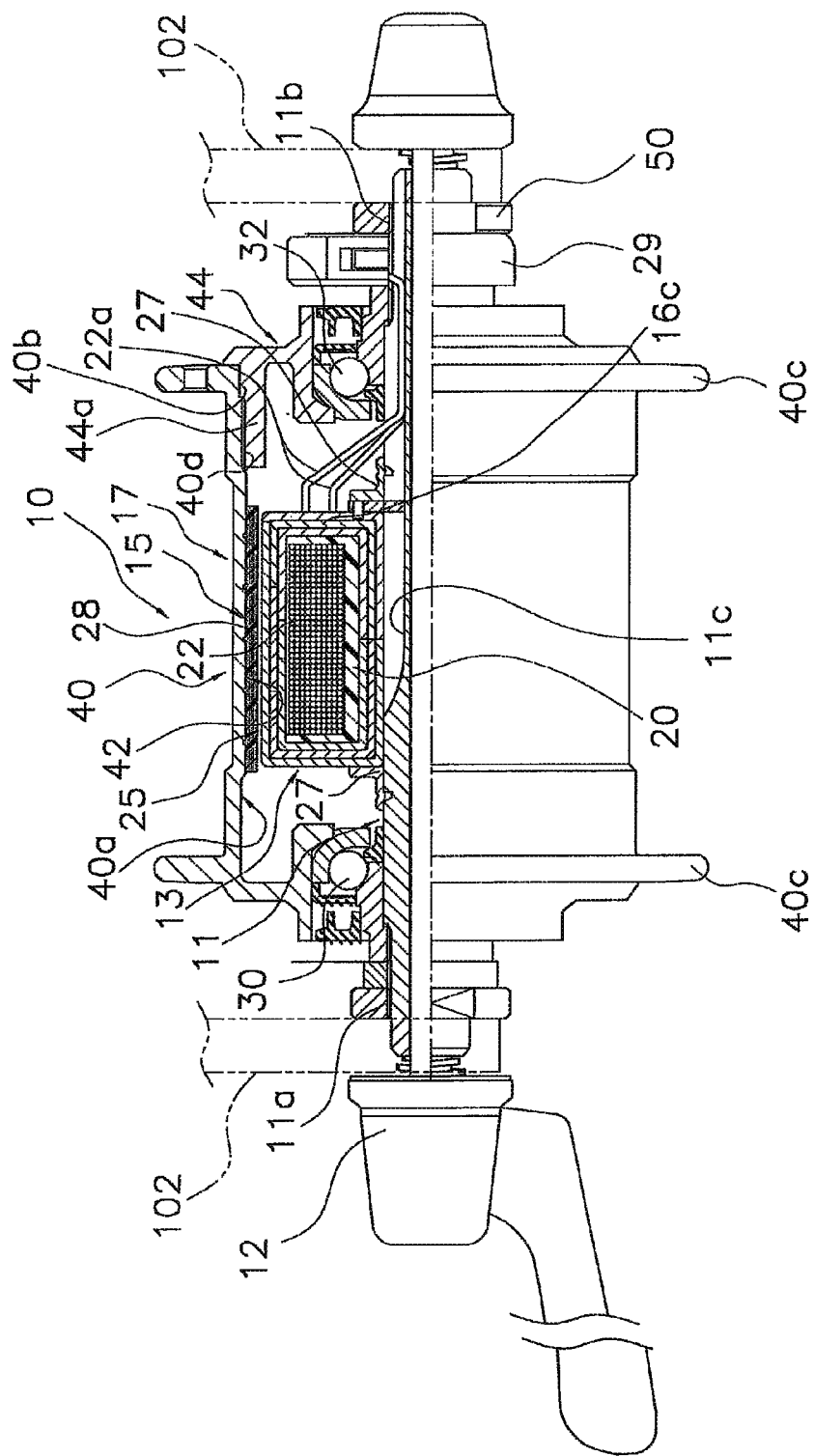
FIG. 1 is a half cross sectional view of a bicycle generator hub that is equipped with hub shell in accordance with a first embodiment.

Referring initially to FIG. 1, a bicycle generator hub (hub dynamo) 10 is illustrated in accordance with a first embodiment. As shown in FIG. 1, the bicycle generator hub (hub dynamo) 10 is installed on a front fork 102 of a bicycle. The generator hub 10 basically comprises a hub axle 11, a stator 13, a rotor 15 and a hub shell 17. The stator 13 is fixed to the hub axle 11. The rotor 15 is arranged radially outward of the stator 13. The hub shell 17 is fixed to the rotor 15.

The hub axle 11 is hollow and detachably fastened to the front fork 102 with, for example, a quick release mechanism 12. A first externally threaded section 11a is formed on an external circumferential surface of a first end (left-hand end in FIG. 1) of the hub axle 11. A second externally threaded section 11b is formed on an external circumferential surface of a second end (right-hand end in FIG. 2) of the hub shaft 11. Additionally, an axial groove 11c extending in an axial direction from a middle portion to the second end is formed in the external circumferential surface of the hub axle 11. The axial groove 11c is used to arrange an electrical wire 22a that extends from a coil 22 (explained later). A connector 29 is fixed to the second externally threaded section 11b with a nut member 50 for supplying electric power from the coil 22 to a headlamp or other external device.

The rotor 13 has a coil bobbin 20 through which the hub axle 11 is passed, a coil 22 wound onto the coil bobbin 20, and a yoke 25 arranged on the coil bobbin 20 such that it surrounds a periphery of the coil 22. The rotor 13 is fixed non-rotatably to the hub axle 11 with a pair of fastening members 27 that are fastened to the hub axle 11 at both ends of the coil bobbin 20.

The rotor 15 has the hub shell 17 and an annular magnet 28 fixed to an internal circumferential surface of the hub shell 17. The magnet 28 has N poles and S poles arranged alternately along a circumferential direction Y. The magnet 28 is a bond magnet fixed to the internal circumferential surface of the hub shell 17 by injection molding. The bond magnet is made of a mixture of ferrite, a rare earth metal alloy, or another magnetic powder and a synthetic resin (including an adhesive). Also, there are no particular limitations on the type of magnetic powder and it is acceptable to select any magnetic powder that offers the required performance. Similarly, there are no particular limitations on the synthetic resin.

The hub shell 17 is supported at both ends on a first bearing 30 and a second bearing 32 such that it rotates freely about the hub shaft 11. The hub shell 17 comprises a shell main body 40, a magnet arrangement section 42 and a lid member 44. The shell main body 40 is generally cylindrical, and is open at one end. The magnet arrangement section 42 is provided on an internal circumferential surface 40a of the shell body 40. The shell main body 40 is an example of a main body. As seen in FIG. 1, the shell main body 40 is tubular and does not have a perfect cylindrical shape with a constant circular cross section. Moreover, the shell main body 40 does not have to have a circular cross section at all. For example, the shell main body 40 can be a tubular member with a square cross section, an octagonal cross section, etc. Thus, the term "cylindrical shape" as used herein is not limited to a tubular member with a circular cross section.

The magnet 28 is injection molded on the internal circumferential surface 40a of the shell body 40. The lid member 44 that covers the opening 40b of the shell main body 40. The shell main body 40 has a pair of annular hub flanges 40c. The annular hub flanges 40c are formed on the external circumferential surface of the shell main body 40 such that one of the hub flanges 42 is arranged on each end of the shell main body 40. An internally threaded section 40d is provided on the internal circumferential surface 40a of the opening 40b of the shell main body 40. The internally threaded section 40d meshes with the lid member 44 such that the lid member 44 is screwed into the opening 40b of the shell main body 40. A first end portion of the shell main body 40 is rotatably supported on the hub axle 11 with the first bearing 30. The first end portion of the shell main body 40 is located on the opposite side as the opening 40b.

Figure 2:
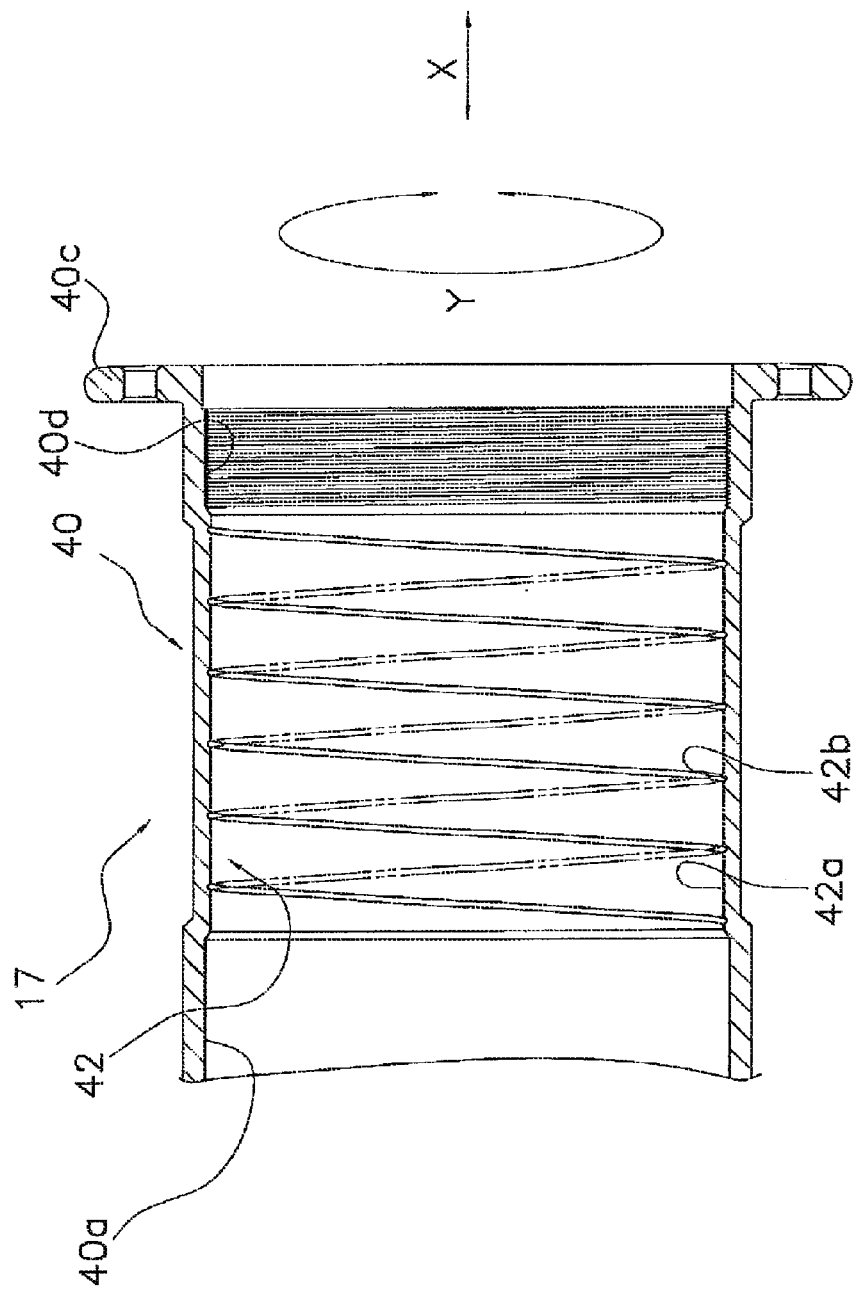
FIG. 2 is a cross sectional view of the hub shell of the bicycle generator hub illustrated in FIG. 1.

As shown in FIG. 2, the magnet arrangement section 42 includes an even section 42a and a non-even section 42b with respect to the even section 42a. The term "even" as used herein means regular; free from perceptible projections or indentations. The non-even section 42b is configured as a recess a narrow spirally groove in this example) with respect to the even section 42a. The even section 42a comprises a circular cylindrical surface that extends in a helical shape. The non-even section 42b comprises a groove (narrow groove) that extends in a helical and linear shape. As a result, the helical and linear non-even section 42b extends so as to be non-parallel to both the axial direction X and the circumferential direction Y of the shell main body 40. Since a portion of the magnet 28 enters into the non-even section 42b when the magnet 28 is injection molded, movement of the magnet 28 can be restricted in the axial direction X and the circumferential direction Y and the magnet 28 can be positioned simply and reliably.

Returning to FIG. 1, the lid member 44 is fastened to the shell main body 40 by being threaded together with the internally threaded section 40d of the shell main body 40. The lid member 44 has a cylindrical section 44a that meshes with the internally threaded section 40d. The lid member 44 is rotatably supported on the hub axle 11 by the second bearing 32, which is attached to the lid member 44.

With a hub shell 17 configured as explained heretofore, at least the magnet arrangement section 42 of the shell main body 40 is arranged inside a magnet forming mold. A molten synthetic resin with a magnetic powder mixed therein is injected into the mold and the magnet 28 is formed. When this is done, a portion of the molten material enters into the helical and recessed non-even section 42b. As a result, movement of the magnet 28 can be restricted in the axial direction X and the circumferential direction Y and the magnet 28 is positioned simply and reliably.

Also, the linear and helically shaped non-even section 42b can be obtained easily because it can be formed by machining in a continuous fashion.

Figure 3:
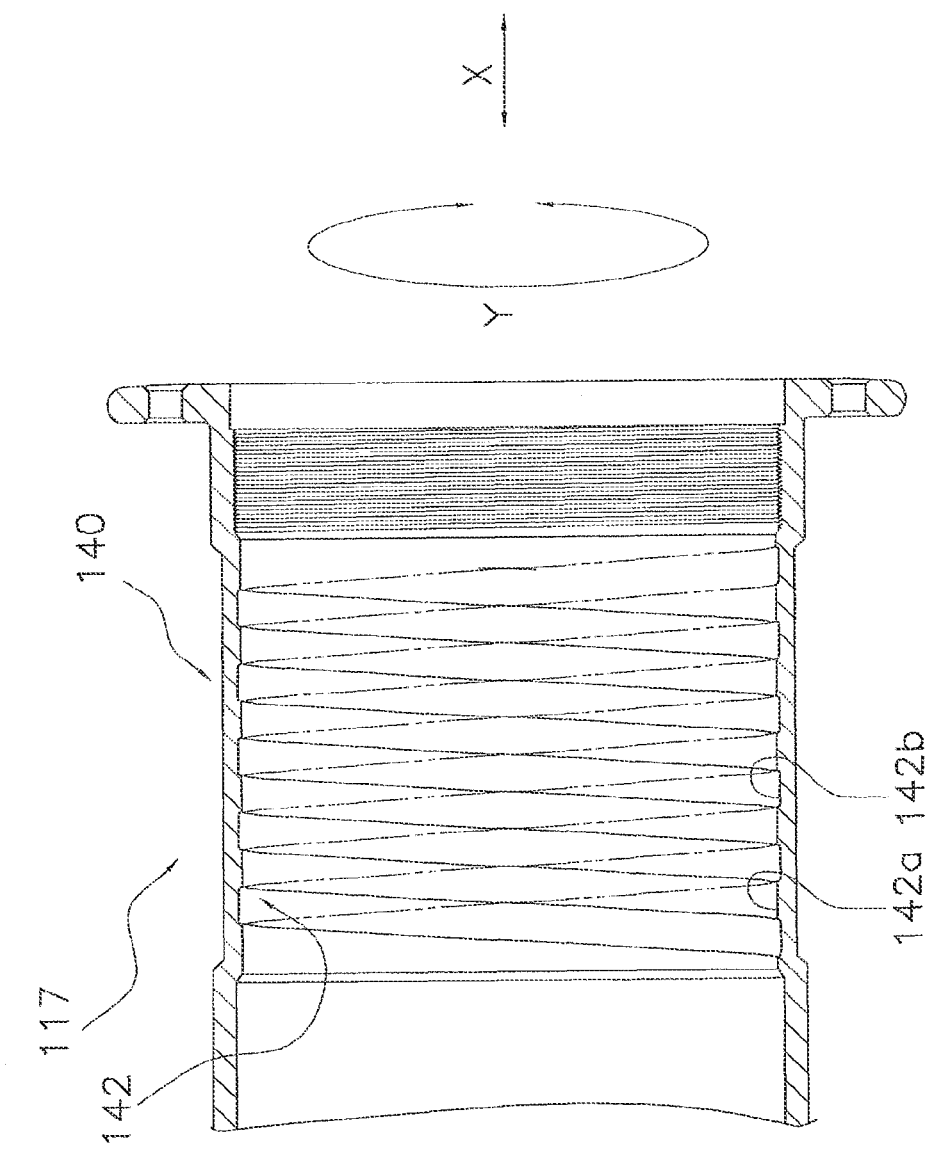
FIG. 3 is a cross sectional view, corresponding to FIG. 2, of a hub shell according to a variation of the first embodiment.

Referring now to FIG. 3, a variation of the first embodiment will now be discussed. In this variation of the first embodiment, a hub shell 117 replaced the hub shell 17 in the bicycle generator hub 10 of the first embodiment. The hub shell 117 has a shell main body 140 and a magnet arrangement section 142. Basically, as discussed below, the magnet arrangement section 142 of this variation is the only difference from the first embodiment. Thus, the constituent features of the magnet arrangement section 142 of this variation are explained while explanations of other parts of the hub shell 117 are omitted for the sake of brevity.

As shown in FIG. 3, in this variation of the first embodiment, the magnet arrangement section 142 of the shell main body 140 of the hub shell 117 includes an even section 142a and a non-even section 142b with respect to the even section 142a. The even section 142a of the magnet arrangement section 142 comprises a circular cylindrical surface formed to have a helical shape. The non-even section 142b, too, comprises a circular cylindrical surface formed to have a helical shape. The internal diameter of the non-even section 142b is larger than the internal diameter of the even section 142a. In this variation of the first embodiment, the axial lengths of the even section 142a and the non-even section 142b are substantially the same. However, it is acceptable to make the axial lengths of the even section 142a and the non-even section 142b different from each other. With this variation, since a larger portion of the magnet 28 enters into the non-even section 142b, the magnetic force of the magnet can be strengthened in addition to e previously explained effects of the first embodiment.

Figure 4:
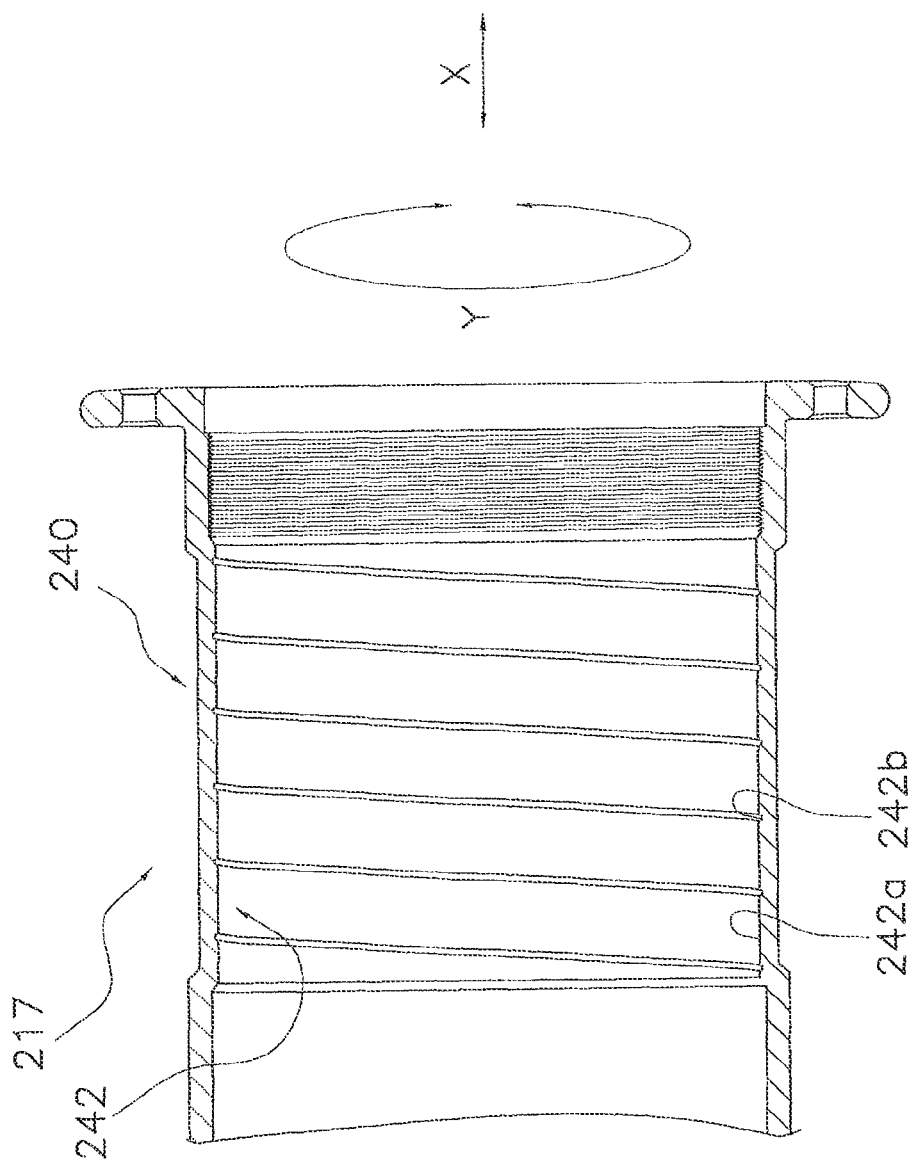
FIG. 4 is a cross sectional view, corresponding to FIG. 2, of a hub shell according to a second embodiment.

Referring now to FIG. 4, a hub shell 217 according to a second embodiment will now be discussed. In this second embodiment, the hub shell 217 replaced the hub shell 17 in the bicycle generator hub 10 of the first embodiment. The hub shell 217 has a shell main body 240 and a magnet arrangement section 242. Basically, as discussed below, the magnet arrangement section 242 of this second embodiment is the only difference from the first embodiment. Thus, the constituent features of the magnet arrangement section 242 of this second embodiment are explained while explanations of other parts of the hub shell 217 are omitted for the sake of brevity.

As shown in FIG. 4, the magnet arrangement section 242 of the shell main body 240 of the hub shell 217 includes an even section 242a and a non-even section 242b with respect to the even section 242a. The non-even section 242b comprises a plurality of elliptical grooves formed to be slanted at an angle. The even section 242a comprises a plurality of circular cylindrical surfaces formed between the grooves of the non-even section 242b. Each of the elliptical grooves of the non-even section 242b has an endless shape. Thus, in the second embodiment, too, the non-even section 242b is non-parallel with respect to both the axial direction X and the circumferential direction Y. With this embodiment, since each of the elliptical grooves of the non-even section 242b has an endless shape and can be formed with a single process, the non-even section 242b can be obtained easily. Although the non-even section 242b of the second embodiment is illustrated as having six endless grooves, any number of grooves is acceptable so long as there is at least one groove.

Figure 5:
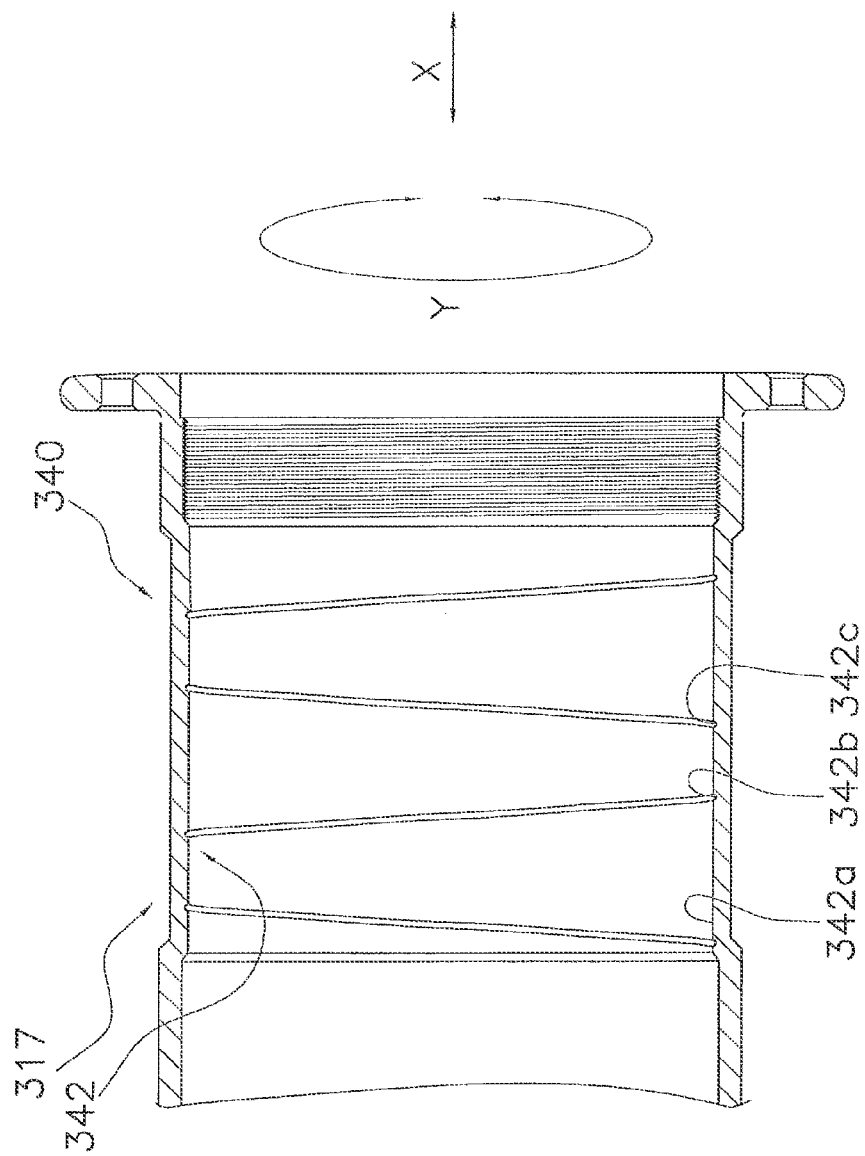
FIG. 5 is a cross sectional view, corresponding to FIG. 2, of a hub shell according to a variation of the second embodiment.

Referring now to FIG. 5, a hub shell 317 according to a variation of the second embodiment will now be discussed. In this variation of the second embodiment, the hub shell 317 replaced the hub shell 17 in the bicycle generator hub 10 of the first embodiment. The hub shell 317 has a shell main body 340 and a magnet arrangement section 342. Basically, as discussed below, the magnet arrangement section 342 of this variation of the second embodiment is the only difference from the first embodiment. Thus, the constituent features of the magnet arrangement section 342 of this variation of the second embodiment are explained while explanations of other parts of the hub shell 317 are omitted for the sake of brevity, As shown in FIG. 5, the magnet arrangement section 342 of the shell main body 340 of the hub shell 317 includes an even section 342a and a plurality of endless non-even sections 342b and 342c with respect to the even section 342a. The endless non-even sections 342b and 342c have different slant directions that are provided in the magnet arrangement section 342 of the hub main body 340. Thus, the axial length of the circular cylindrical surface of the even section 342a varies gradually depending on the position along the circumferential direction. The non-even sections 342b and 342c are arranged alternately so as to be left-right mirror images of each other in a sectional view. With this configuration, too, the magnet can be positioned simply and reliably. It is also acceptable to arrange a plurality of the non-even sections 342b adjacent to one another and a plurality of the non-even sections 342c adjacent to one another in the magnet arrangement section 342.

Figure 6:
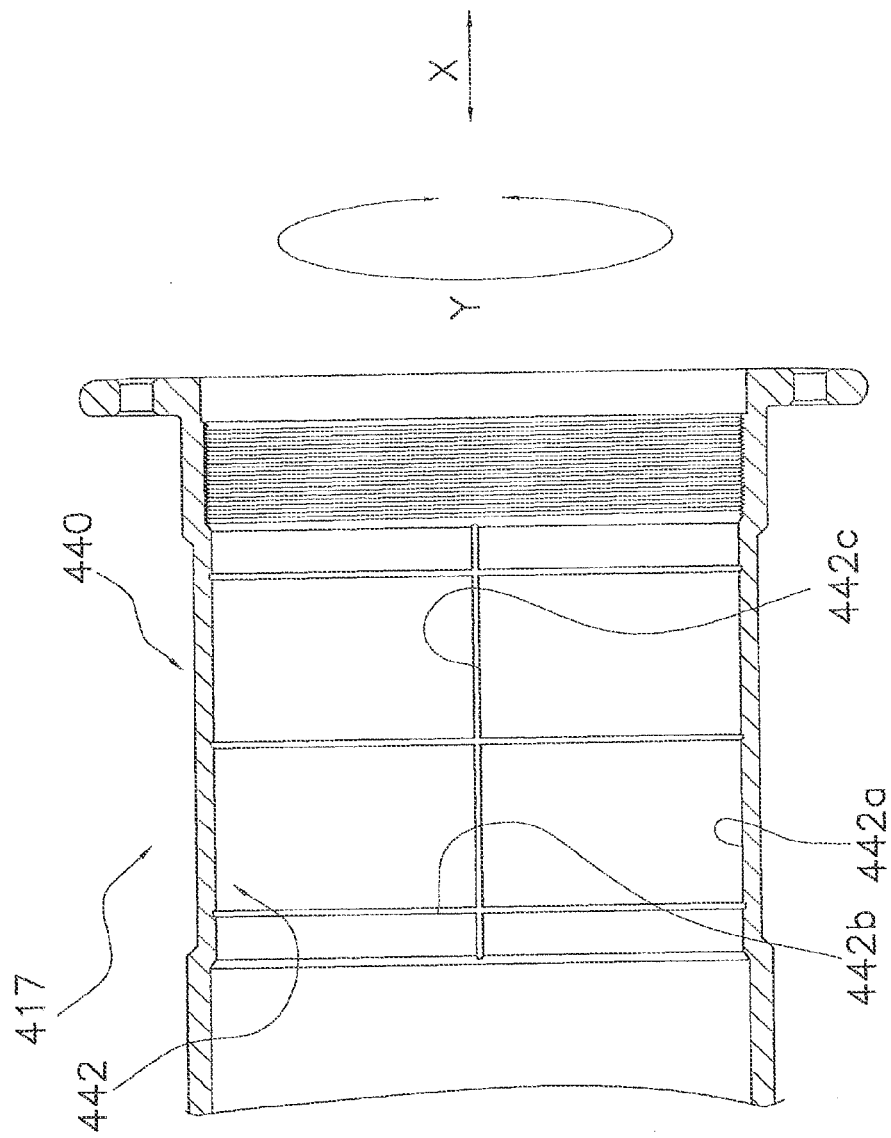
FIG. 6 is a cross sectional view, corresponding to FIG. 2, of a hub shell according to a third embodiment.

Referring now to FIG. 6, a hub shell 417 according to a third embodiment will now be discussed. In this third embodiment, the hub shell 417 replaced the hub shell 17 in the bicycle generator hub 10 of the first embodiment. The hub shell 417 has a shell main body 440 and a magnet arrangement section 442. Basically, as discussed below, the magnet arrangement section 442 of this third embodiment is the only difference from the first embodiment. Thus, the constituent features of the magnet arrangement section 442 of this third embodiment are explained while explanations of other parts of the hub shell 417 are omitted for the sake of brevity.

As shown in FIG. 6, the magnet arrangement section 442 of the shell main body 440 of the hub shell 417 includes an even section 442a and a plurality of endless non-even sections 442b and 442c with respect to the even section 442a. The first non-even sections 442b are recesses and linear, and extend in the circumferential direction Y. The second non-even sections 442 are recesses and linear, and extend in the axial direction X. The even section 442a comprises a surface arranged between the first non-even section 442b and the second non-even section 442c. FIG. 6 only shows one of the second non-even sections 442c, but preferably another one of the second non-even sections 442c is located one hundred eighty degrees from the illustrated one of the second non-even sections 442c. With the third embodiment, the first non-even sections 442b and the second non-even sections 442c can be formed easily because they have simple shapes.

Figure 7:
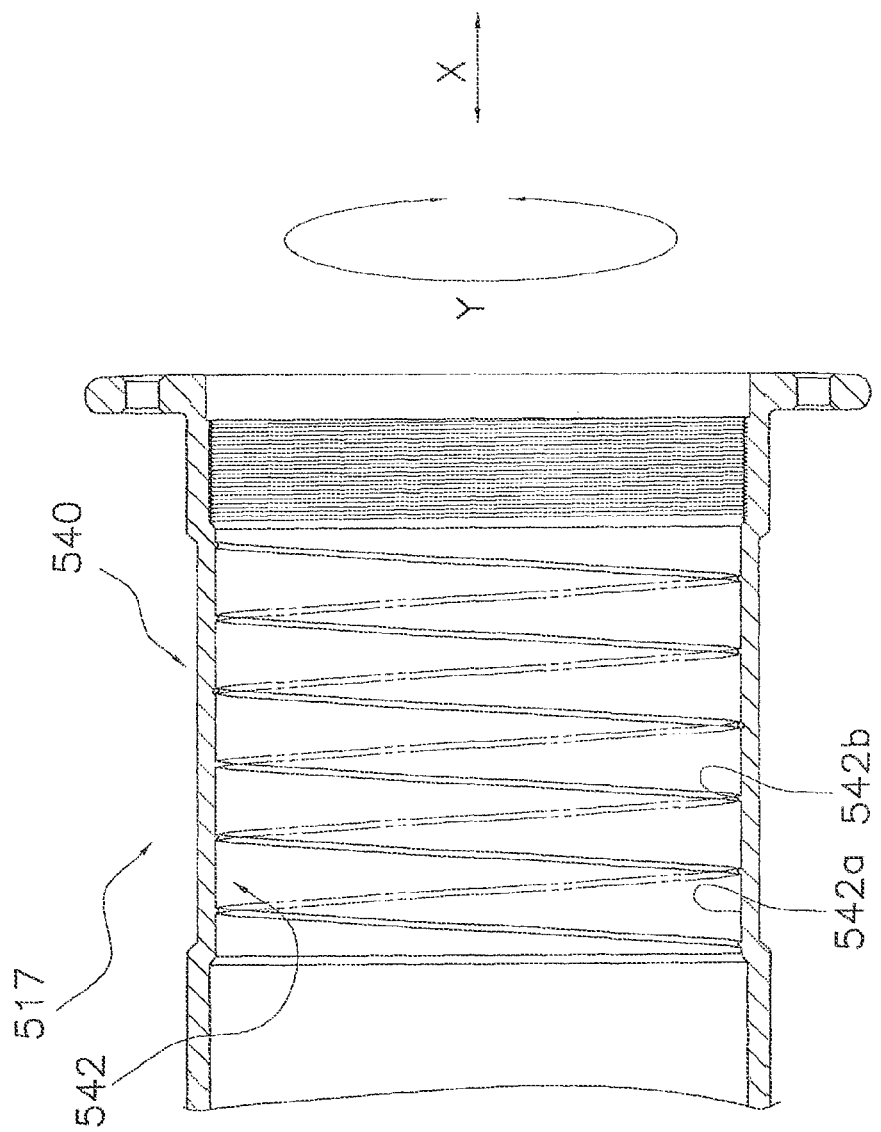
FIG. 7 is a cross sectional view of a hub shell according to a fourth embodiment, and corresponds to FIG. 2.

Referring now to FIG. 7, a hub shell 217 according to a fourth embodiment will now be discussed. In this fourth embodiment, the hub shell 517 replaced the hub shell 17 in the bicycle generator hub 10 of the first embodiment. The hub shell 517 has a shell main body 540 and a magnet arrangement section 542. Basically, as discussed below, the magnet arrangement section 542 of this fourth embodiment is the only difference from the first embodiment. Thus, the constituent features of the magnet arrangement section 542 of this fourth embodiment are explained while explanations of other parts of the hub shell 517 are omitted for the sake of brevity.

As shown in FIG. 7, the magnet arrangement section 542 of the shell main body 540 of the hub shell 517 includes an even section 542a and a non-even sections 542b with respect to the even section 542a. The non-even section 542b has a linear shape protrusion. The non-even section 542b extends in a helical shape similarly to the non-even section 42b of the first embodiment. Other than the non-even section 542b having a protruded form, the hub shell 517 of the fourth embodiment is the same as the hub shell 17 of the first embodiment, and thus, a detailed explanation of the hub shell 517 is omitted. It is also clearly acceptable for the non-even sections of the second and third embodiments to be configured as protrusions.

The present invention is not limited to the embodiments described heretofore. Various changes can be made without departing from the scope of the invention as presented in the claims.

Although in the previously explained embodiments the magnet arrangement section 42 is provided on the shell main body 40, the present invention is not limited to such a configuration. For example, it is acceptable for the magnet arrangement section to be provided on an internal circumferential surface of the lid member. In such a case, the lid member is an example of the main body.

Although in the previously explained embodiments the bicycle generator hub is for a front wheel, the present invention is not limited to a front wheel application. For example, the present invention can be applied to a bicycle generator hub for a rear wheel.

Moreover, components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hub shell for a bicycle generator hub comprising:
   a main body having a tubular shape with an internal circumferential surface, the internal circumferential surface of the main body including a magnet arrangement section, the magnet arrangement section including a linear-shaped recess formed in the internal circumferential surface; and
   a magnet injection molded on the magnet arrangement section of the main body such that the magnet enters into the recess, the magnet being a bond magnet made of a mixture of a magnetic material and a synthetic resin, the magnet forming a radially innermost surface of the hub shell at the magnet arrangement section.

2. The hub shell according to claim 1, wherein
   the recess includes a first section that has a linear shape and extends in an axial direction of the main body, and a second section that has a linear shape and extends in a circumferential direction of the main body.

3. A bicycle generator hub including e hub shell according to claim 1, the bicycle generator hub comprising:
   a hub axle rotatably disposed in the main body of the hub shell; and
   a stator fixed to the hub axle.

4. The hub shell according to claim 1, wherein
   the magnetic material is a magnetic powder.

5. The huh shell according to claim 1, wherein
   the recess has a helical shape.

6. The hub shell according to claim 1, wherein
   the recess has an endless shape.

7. The hub shell according to claim 6, wherein
   the recess includes a plurality of recesses having an endless shape.

8. A hub shell for a bicycle generator hub comprising:
   a main body having a tubular shape with an internal circumferential surface;
   a magnet arrangement section provided on the internal circumferential surface of the main body to arrange a magnet formed therein by injection molding, the magnet arrangement section being disposed in an axially middle portion of the internal circumferential surface such that the magnet arrangement section faces a coil disposed radially inward of the magnet arrangement section when the hub shell is installed in the bicycle generator hub; and
   a magnet injection molded onto the magnet arrangement section of the main body, the magnet being a bond magnet made of a mixture of a magnetic material and a synthetic resin;
   the magnet arrangement section including an even section and a non-even section, the non-even section being configured as one of a recess and a protrusion with respect to the even section, the non-even section having a linear shape and extending non-parallel with respect to each of an axial direction and a circumferential direction of the main body, the magnet covering the even section and the non-even section such that the magnet forms a radially innermost surface of the hub shell at the magnet arrangement section.

9. The hub shell according to claim 8, wherein
   the non-even section has a helical shape.

10. The hub shell according to claim 8, wherein
   the non-even section has an endless shape.

11. The hub shell according to claim 10, wherein
   the non-even section includes a plurality of separate non-even sections.

12. The hub shell according to claim 8, wherein
   the non-even section is configured as a recess.

13. The hub shell according to claim 12, wherein
   the non-even section has a helical shape.

14. The hub shell according to claim 12, wherein
   the non-even section has an endless shape.

15. The hub shell according to claim 14, wherein
   the non-even section includes a plurality of separate non-even sections.

16. A hub shell for a bicycle generator huh comprising:
   a main body having a tubular shape with an internal circumferential surface, the internal circumferential surface of the main body including a magnet arrangement section, the magnet arrangement section including a linear-shaped protrusion with respect to the internal circumferential surface, the protrusion having a helical shape; and a magnet injection molded on the magnet arrangement section of the main body such that the magnet enters around the protrusion and forms a radially innermost surface of the hub shell at the magnet arrangement section, the magnet being a bond magnet made of a mixture of a magnetic material and a synthetic resin, the magnet forming a radially innermost surface of the hub shell at the magnet arrangement section.

* * * * *